United States Patent Office 3,428,184
Patented Feb. 18, 1969

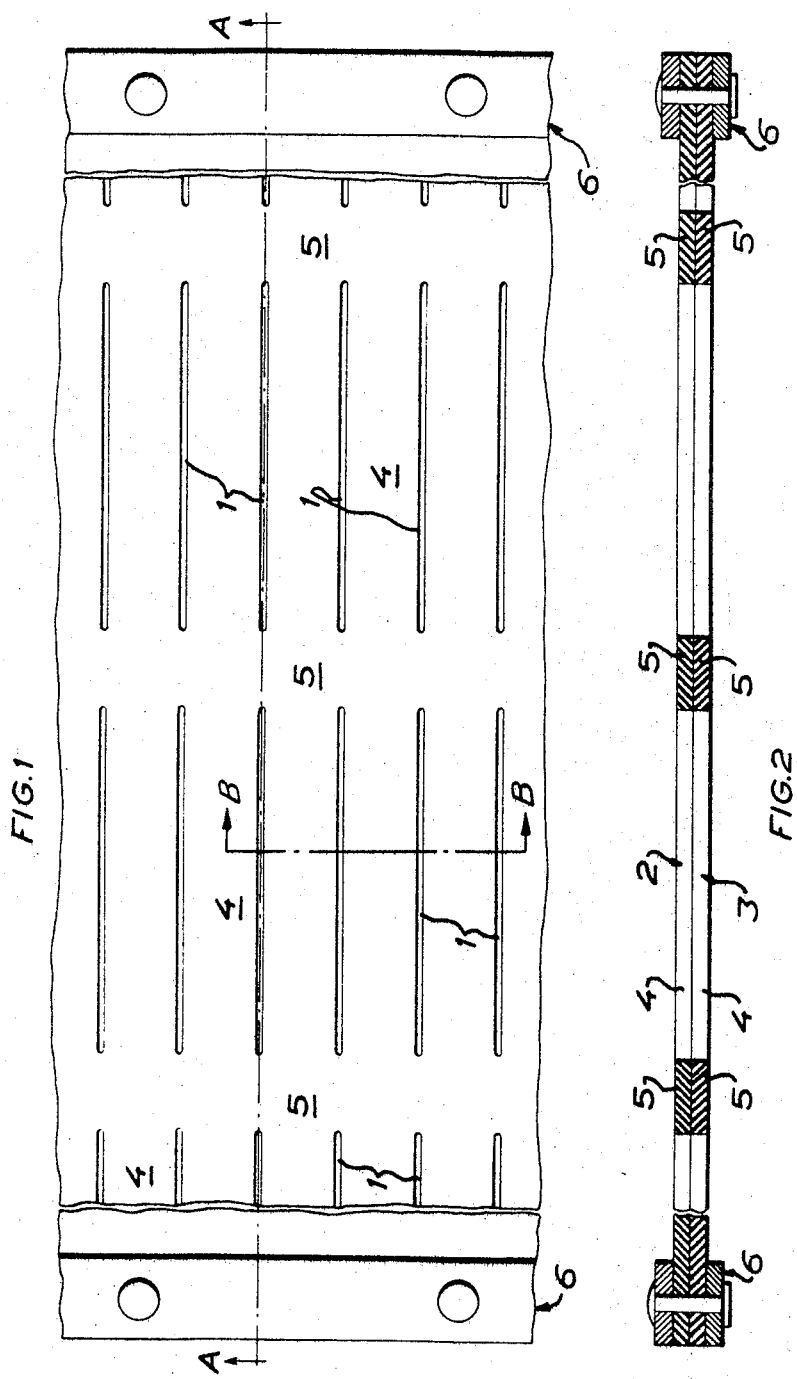

3,428,184
SCREENS FOR REMOVAL OF LIQUID
FROM SLUDGE MATERIALS
Walter Küper, Bochum-Stiepel, Germany, assignor to
Trelleborgs Gummifabriks Aktiebolag, Trelleborg,
Sweden
Filed Jan. 9, 1967, Ser. No. 608,004
Claims priority, application Germany, Jan. 10, 1966,
K 58,103; Jan. 14, 1966 (utility model), K 53,320
U.S. Cl. 210—489                  3 Claims
Int. Cl. B01d 25/04

ABSTRACT OF THE DISCLOSURE

A screen for removal of liquid from sludge materials having two interconnected webs of resilient material each having narrow holes therein arranged in rows across the screen. One of the webs is prestressed in relation to the other, the prestressing being in the direction across the screen and along the rows of holes. The prestressing serves to make the screen self-cleaning so as to prevent clogging as far as possible. The resilient material may be natural or synthetic rubber or a rubber-like material. The holes may be in form of slits or square holes. The holes in the prestressed web are preferably narrower than the holes in the other web. The holes may have the same width through the thickness of the webs or may taper towards the top of the webs.

---

It is previously known to provide resilient ribs within a frame across the screen web transversely of the slits or rows of holes therein in order to impart to the screen sufficient strength to withstand sudden tensile stresses. To provide the rib reinforcement, special operations are necessary by which the manufacturing costs of the screen are greatly increased.

The invention has for one of its objects to simplify the construction of a screen or a screen assembly for removal of liquid from sludge materials or the like. According to the invention, there is provided a screen for removal of liquid from sludge materials comprising two webs of resilient material superimposed one upon the other and interconnected over their entire surface, and means defining holes arranged in rows in said webs, one of said webs, in relation to the other of said webs, being prestressed in the direction of the rows of holes and of tensile stresses imparted by the sludge materials supported by the screen.

In another aspect of the invention there is provided a screen assembly for sludge materials comprising frame means, two webs of resilient material superimposed one upon the other and connected with each other and with said frame, and means defining slits in said webs, one of said webs, in relation to the other of said webs, being prestressed in the direction of the slits and of tensile stresses imparted by the sludge materials supported by the screen.

Further objects of the invention will appear from the following disclosure and the accompanying drawings which schematically illustrates embodiments of the screen assembly according to the invention. In the drawings:

FIG. 1 is a top plan view of the screen assembly according to the invention;

FIG. 2 is a section along line A—A of the screen assembly illustrated in FIG. 1;

Figure 3C:
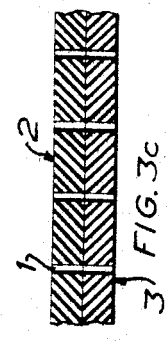
FIGS. 3a, 3b and 3c are sections on line B—B in FIG. 1.

As will appear from the drawings, the screen according to the invention consists of two superimposed webs 2 and 3 provided with narrows slits 1 to form grid-like portions 4 in the webs.

In a screen frame 6, the slits are so interrupted that longitudinal strips 5 are formed transversely of the slits 1 and the grid-like portions 4.

According to the invention, one of the slitted webs 2, 3 is prestressed prior to its connection with the other slitted web 3 or 2. The interconnection of the webs is realized by gluing the webs together throughout their facing surfaces.

The prestressing is effected in the direction of the tensile stresses to which the two webs 2 and 3 are subjected during use of the screen. The magnitude of this prestressing corresponds to the size of the tensile stresses occurring in the screen during the removal of liquid from the sludge. In this manner, there is practically no space between the grid-like portions 4 in position of rest, the slits being practically fully closed. During the liquid removal operation, the grid portions 4 endeavour to maintain a minimum distance between each other in order to enable the material to be treated to slide away on their surface, while the liquid to be separated can penetrate through the slits. The distance between the grid portions 4 being resiliently self-adjusting, the screen is cleaned so that clogging is prevented as far as possible.

Figure 3B:
Figure 3A:

In the embodiment shown in FIG. 3a the slits 1 in the two webs are narrower at the top than at the bottom, and the slits in the upper web 2 are narrower than those in the lower web 3. Such a shape of the slits is advantageous in that it decreases the risk of the slits being clogged by the solid sludge particles during liquid removal.

In the embodiment shown in FIG. 3b the slits 1 in each web 2 and 3, respectively, have the same width through the thickness of the web, but the slits in the upper web 2 are narrower than those in the lower web 3.

As will appear from FIG. 3c it is also possible, though not as advantageous, to have the same width for the slits 1 in the two webs 2, 3.

Figure 4:
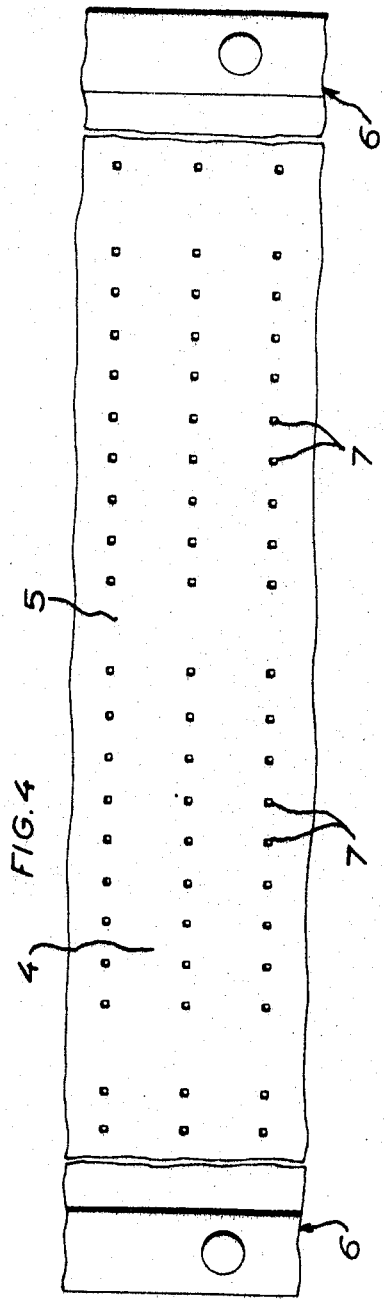
FIG. 4 is a top plan view of the screen assembly in another embodiment thereof.

FIG. 4 shows a further embodiment of the screen according to the invention. In this embodiment the slits 1 have been replaced by rows of holes 7 which may have any of the cross-sectional shapes shown in FIGS. 3a, 3b and 3c.

What I claim and desire to secure by Letters Patent is:

1. A screen assembly for removal of liquids from sludge materials comprising frame means, two webs of resilient material and means defining slits in said webs, one of said webs, in relation to the other of said webs, being prestressed in the direction of the slits, said webs being superimposed one upon the other and interconnected over their entire surface with the slits opposite each other and being connected with said frame means.

2. The screen assembly of claim 1 wherein said webs are formed of a material from the group consisting of natural rubbers, synthetic rubbers and non-rubber but rubber-like materials.

3. The screen assembly of claim 1 wherein said means defining slits in said prestressed web, define narrower slits than do said slit-defining means in said other web.

References Cited

UNITED STATES PATENTS

| | | | |
|---|---|---|---|
| 105,755 | 7/1870 | Winchester | 210—498 |
| 1,540,325 | 6/1925 | Fuller. | |
| 1,663,298 | 3/1928 | Geer et al. | 210—498 |
| 1,916,393 | 7/1933 | Smith | 210—498 X |
| 2,272,175 | 2/1942 | Jordan | 210—498 X |

REUBEN FRIEDMAN, *Primary Examiner.*

JOHN ADEE, *Assistant Examiner.*

U.S. Cl. X.R.

210—500